US012489243B2

(12) United States Patent
Lai et al.

(10) Patent No.: US 12,489,243 B2
(45) Date of Patent: Dec. 2, 2025

(54) CONNECTOR PROTECTION DEVICE AND CIRCUIT BOARD MODULE

(71) Applicant: GIGA-BYTE TECHNOLOGY CO., LTD., New Taipei (TW)

(72) Inventors: Chih-Ming Lai, New Taipei (TW); Yung-Shun Kao, New Taipei (TW)

(73) Assignee: GIGA-BYTE TECHNOLOGY CO., LTD., New Taipei (TW)

(*) Notice: Subject to any disclaimer, the term of this patent is extended or adjusted under 35 U.S.C. 154(b) by 312 days.

(21) Appl. No.: 18/472,231

(22) Filed: Sep. 22, 2023

(65) Prior Publication Data
US 2024/0213707 A1 Jun. 27, 2024

(30) Foreign Application Priority Data

Dec. 27, 2022 (TW) ................. 111214376

(51) Int. Cl.
H01R 13/64 (2006.01)
G06F 1/18 (2006.01)
H01R 12/70 (2011.01)
H01R 12/73 (2011.01)
H01R 13/516 (2006.01)

(52) U.S. Cl.
CPC ........... H01R 13/516 (2013.01); G06F 1/185 (2013.01); H01R 12/7047 (2013.01); H01R 12/737 (2013.01)

(58) Field of Classification Search
CPC .... G06F 1/185; H01R 12/7005; H01R 13/516
USPC .......................................... 439/377
See application file for complete search history.

(56) References Cited

U.S. PATENT DOCUMENTS

| 5,650,917 | A  | * | 7/1997  | Hsu ...................... | H05K 7/1407 361/740 |
| 6,219,251 | B1 | * | 4/2001  | Wang ................... | H05K 7/1431 361/752 |
| 6,312,279 | B1 | * | 11/2001 | Rachui ............... | H01R 12/7005 439/377 |
| 6,435,897 | B1 | * | 8/2002  | Paul .................... | H01R 12/7005 439/701 |
| 6,545,877 | B1 | * | 4/2003  | Agha ................... | H05K 7/1429 361/801 |
| 7,331,809 | B2 | * | 2/2008  | Lee ..................... | H01R 12/7011 439/377 |

(Continued)

Primary Examiner — Neil Abrams
(74) Attorney, Agent, or Firm — JCIPRNET

(57) ABSTRACT

A connector protection device includes a protective shell top wall, protective shell side walls, and two position-limiting structures. The protective shell top wall covers a connector top surface and includes a slot corresponding to a connector slot. The slot extends along a first direction. The protective shell side walls are connected to each other and to the protective shell top wall and cover the connector side surfaces. The two position-limiting structures are located adjacent to opposite ends of the slot in the first direction. Each of the position-limiting structures is used to limit a relative position of the expansion card and the connector slot in a second direction perpendicular to the first direction. When the expansion card is inserted into the connector slot through the slot, the expansion card is limited by the two position-limiting structures to maintain the relative position with the connector slot in the second direction.

25 Claims, 8 Drawing Sheets

(56) References Cited

U.S. PATENT DOCUMENTS

| | | | |
|---|---|---|---|
| 7,410,383 B2 * | 8/2008 | Hsieh | H01R 13/629 |
| | | | 439/374 |
| 8,608,503 B2 * | 12/2013 | Kagotani | H01R 13/60 |
| | | | 439/378 |
| 8,986,047 B2 * | 3/2015 | Lai | G06F 1/185 |
| | | | 439/328 |
| 9,397,424 B2 * | 7/2016 | Figuerado | H01R 13/6272 |
| 2021/0351549 A1 * | 11/2021 | Lai | H01R 13/6586 |
| 2023/0198197 A1 * | 6/2023 | Morris | H01R 13/443 |
| | | | 439/78 |
| 2024/0213707 A1 * | 6/2024 | Lai | H01R 13/516 |

* cited by examiner

CONNECTOR PROTECTION DEVICE AND CIRCUIT BOARD MODULE

CROSS-REFERENCE TO RELATED APPLICATION

This application claims the priority benefit of Taiwan utility application serial no. 111214376, filed on Dec. 27, 2022. The entirety of the above-mentioned patent application is hereby incorporated by reference herein and made a part of this specification.

BACKGROUND

Technical Field

The disclosure relates to a protection device and a circuit board module, and more particularly, to a connector protection device and a circuit board module.

Description of Related Art

Due to the increased performance of graphics cards, their operating temperatures also rise. To effectively reduce the temperature, the accompanying heat sink of the graphics card has also increased in size. As a result, the graphics card becomes heavier on one side due to the presence of the heat sink, which may cause tilting and lead to the connectors on the commercially available main boards being damaged or cracked under the weight of the graphics card. Currently, graphics cards are equipped with support brackets that are locked onto the computer case to share the weight and prevent damage to the connectors. The research goal in this field is to find a more convenient and simple way for users to protect the connectors.

SUMMARY

This disclosure provides a connector protection device that may protect connectors without requiring additional assembly processes from the users.

The disclosure provides a circuit board module, which includes a connector protection device.

The connector protection device of the disclosure is adapted to be disposed on a connector. The connector is adapted for an expansion card to be inserted. The connector includes a connector top surface, a connector slot recessed in the connector top surface, and multiple connector side surfaces connected to the connector top surface. The connector protection device includes a protective shell top wall, multiple protective shell side walls, and two position-limiting structures. The protective shell top wall covers the connector top surface and includes a slot corresponding to the connector slot. The slot extends along a first direction. The protective shell side walls are connected to each other and to the protective shell top wall. The protective shell side walls cover the connector side surfaces. The two position-limiting structures are located adjacent to opposite ends of the slot in the first direction. Each of the position-limiting structures is used to limit a relative position of the expansion card and the connector slot in a second direction. The second direction is perpendicular to the first direction. In response to the expansion card being inserted into the connector slot through the slot, the expansion card is limited by the two position-limiting structures so as to maintain the relative position with the connector slot in the second direction.

The circuit board module of the disclosure includes a circuit board, a connector, and a connector protection device. The connector is disposed on the circuit board for an expansion card to be inserted and includes a connector top surface, a connector slot recessed in the connector top surface, and multiple connector side surfaces connected to the connector top surface. The connector protection device is disposed on the connector, fixed on the circuit board, and includes a protective shell top wall, multiple protective shell side walls, and two position-limiting structures. The protective shell top wall covers the connector top surface and includes a slot corresponding to the connector slot. The slot extends along a first direction. The protective shell side walls are connected to each other and to the protective shell top wall. The protective shell side walls cover the connector side surfaces. The two position-limiting structures are located adjacent to opposite ends of the slot in the first direction. Each of the position-limiting structures is used to limit a relative position of the expansion card and the connector slot in a second direction. The second direction is perpendicular to the first direction. In response to the expansion card being inserted into the connector slot through the slot, the expansion card is limited by the two position-limiting structures so as to maintain the relative position with the connector slot in the second direction.

In an embodiment of the disclosure, each of the position-limiting structures includes a notch recessed in the protective shell top wall and one of the protective shell side walls.

In an embodiment of the disclosure, a minimum width of the notch in the second direction is less than or equal to a width of the connector slot.

In an embodiment of the disclosure, a depression depth of the notch in the first direction is between 1.5 mm and 5 mm.

In an embodiment of the disclosure, the notch has a maximum width at a position farthest from the slot in the second direction and a minimum width at a position closest to the slot in the second direction.

In an embodiment of the disclosure, the protective shell side walls include multiple locking holes, multiple screwing members pass through the circuit board and are fixed in the locking holes, so that the connector protection device is fixed on the circuit board.

In an embodiment of the disclosure, a thickness of the protective shell side walls at the locking holes is between 1.5 mm and 5 mm.

In an embodiment of the disclosure, the circuit board module further includes a structural reinforcement member. The screwing members sequentially pass through the structural reinforcement member and the circuit board and are fixed in the locking holes.

In an embodiment of the disclosure, a thickness of each of the protective shell side walls is between 1.5 mm and 5 mm.

In an embodiment of the disclosure, the connector protection device further includes multiple reinforcement ribs disposed on the protective shell side walls.

In an embodiment of the disclosure, the reinforcement ribs extend along a third direction on the protective shell side walls and extend from the protective shell top wall to the circuit board.

In an embodiment of the disclosure, the protective shell top wall protrudes from one of the protective shell side walls in the first direction. One of the position-limiting structures includes a portion recessed in the protective shell top wall and protruding from a corresponding protective shell side wall and a notch of the corresponding protective shell side wall. Another protective shell side wall protrudes from the protective shell top wall in a third direction. Another position-limiting structure includes a notch recessed in the protective shell side wall.

In an embodiment of the disclosure, the connector protection device further includes a pivot stand disposed on one of the protective shell side walls for pivoting of an expansion card holder.

Based on the above, the two position-limiting structures in the connector protection device of the disclosure are located adjacent to opposite ends of the slot in the first direction. In response to the expansion card being inserted into the connector slot through the slot, the expansion card is limited by the two position-limiting structures so as to maintain the relative position with the connector slot in the second direction. In this way, the connector protected by the connector protection device is not easily cracked due to the heavy pressure on one side of the inserted expansion card. In addition, the expansion card is limited by the two position-limiting structures in response to being inserted into the connector slot by a user. Thus, there is no need for additional assembly or locking processes, making it very convenient to use.

DESCRIPTION OF THE EMBODIMENTS

Figure 1:
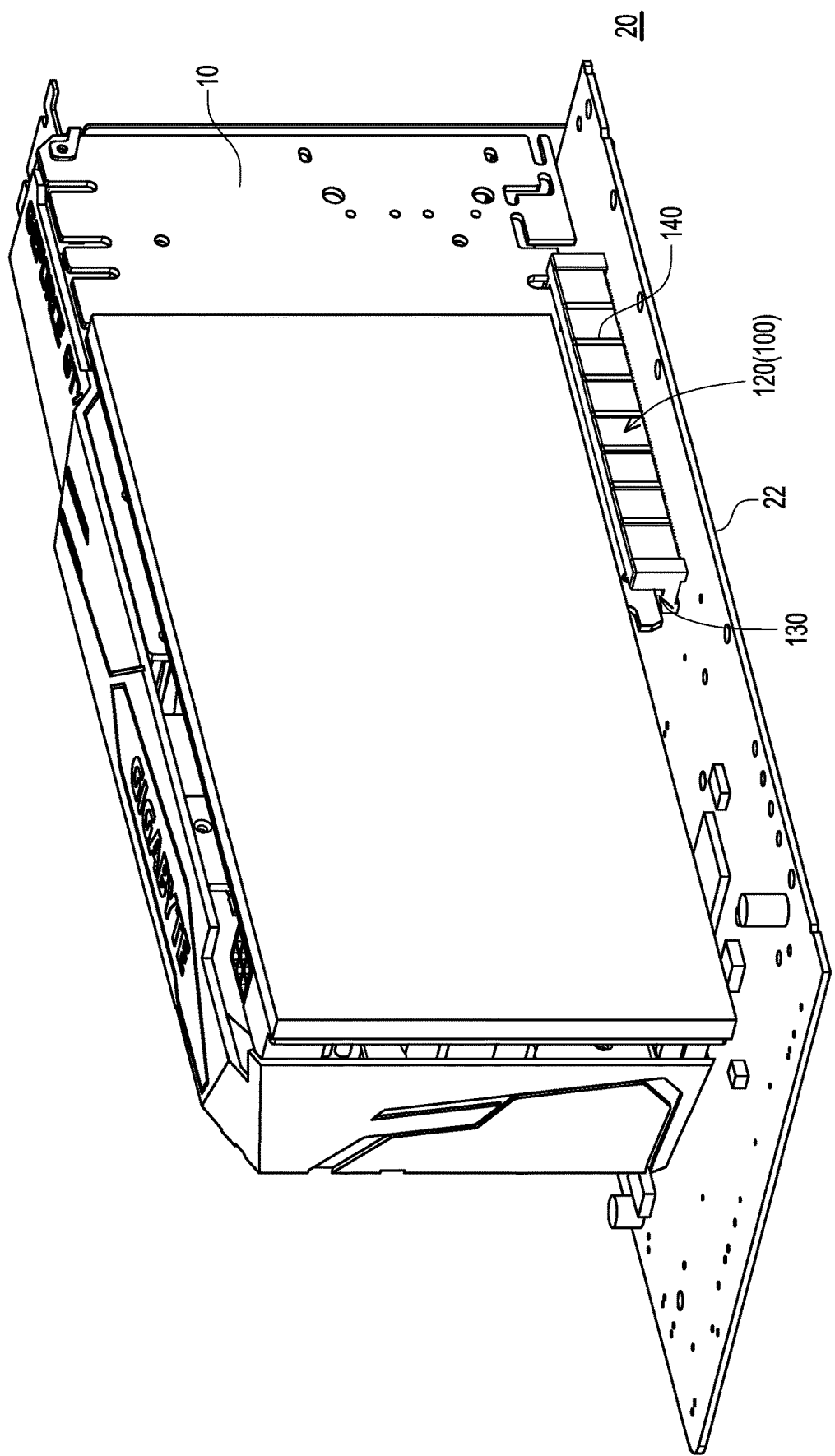
FIG. 1 is a schematic view of a circuit board module according to an embodiment of the disclosure.
Figure 2:
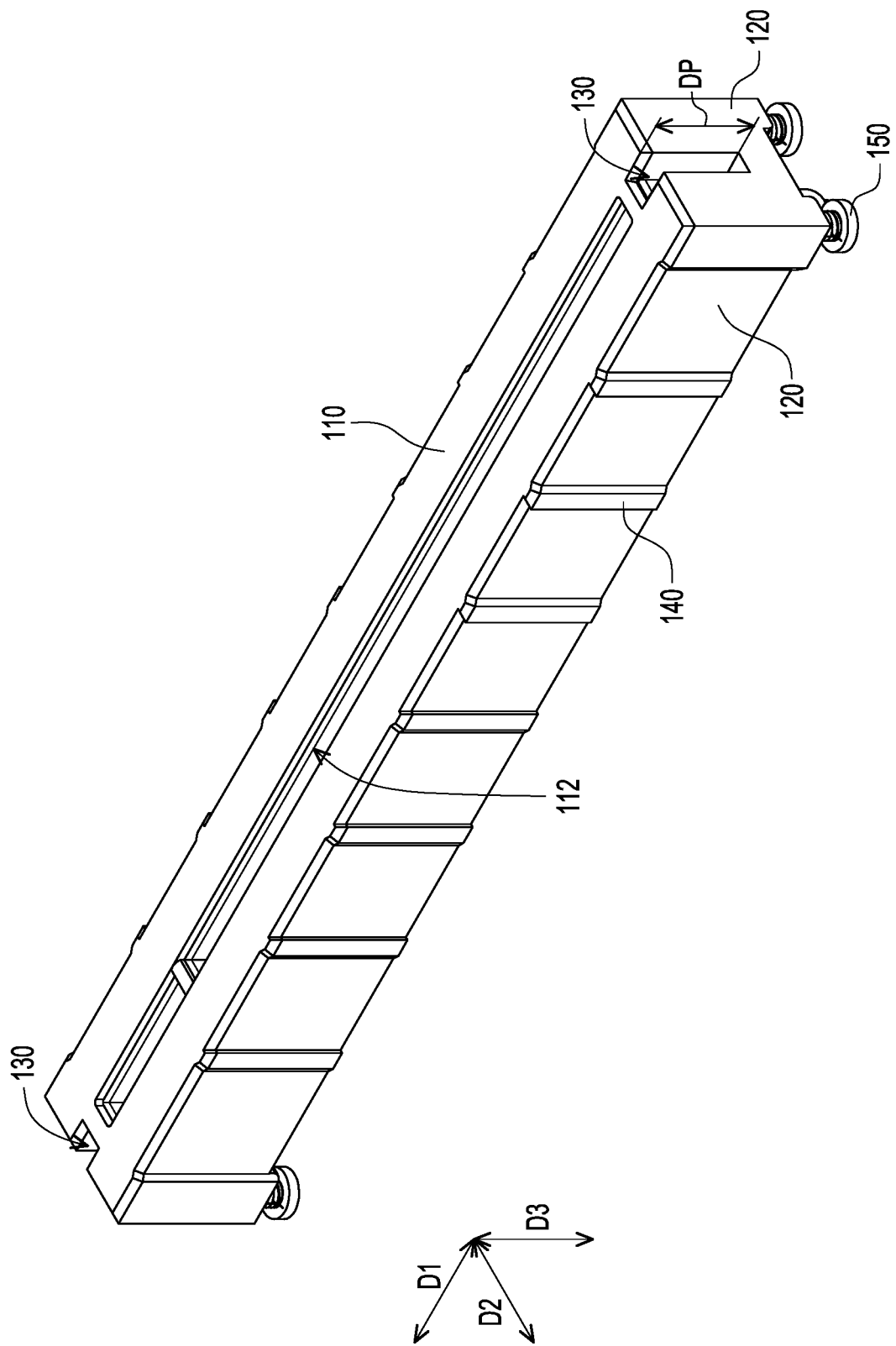
FIG. 2 is a schematic view of the connector protection device of the circuit board module in FIG. 1.
Figure 3:
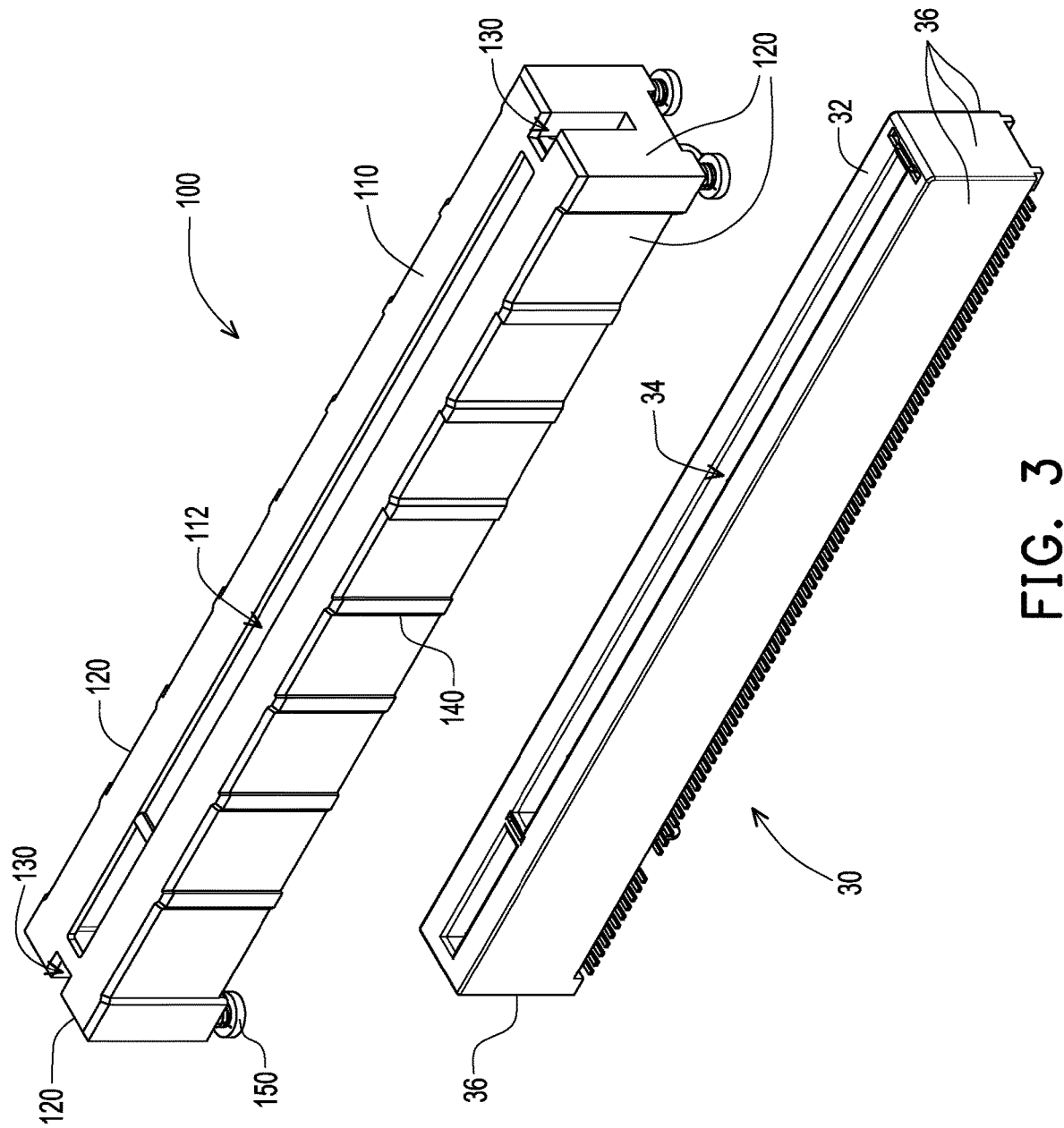
FIG. 3 is a schematic exploded view of FIG. 2.
Figure 4:
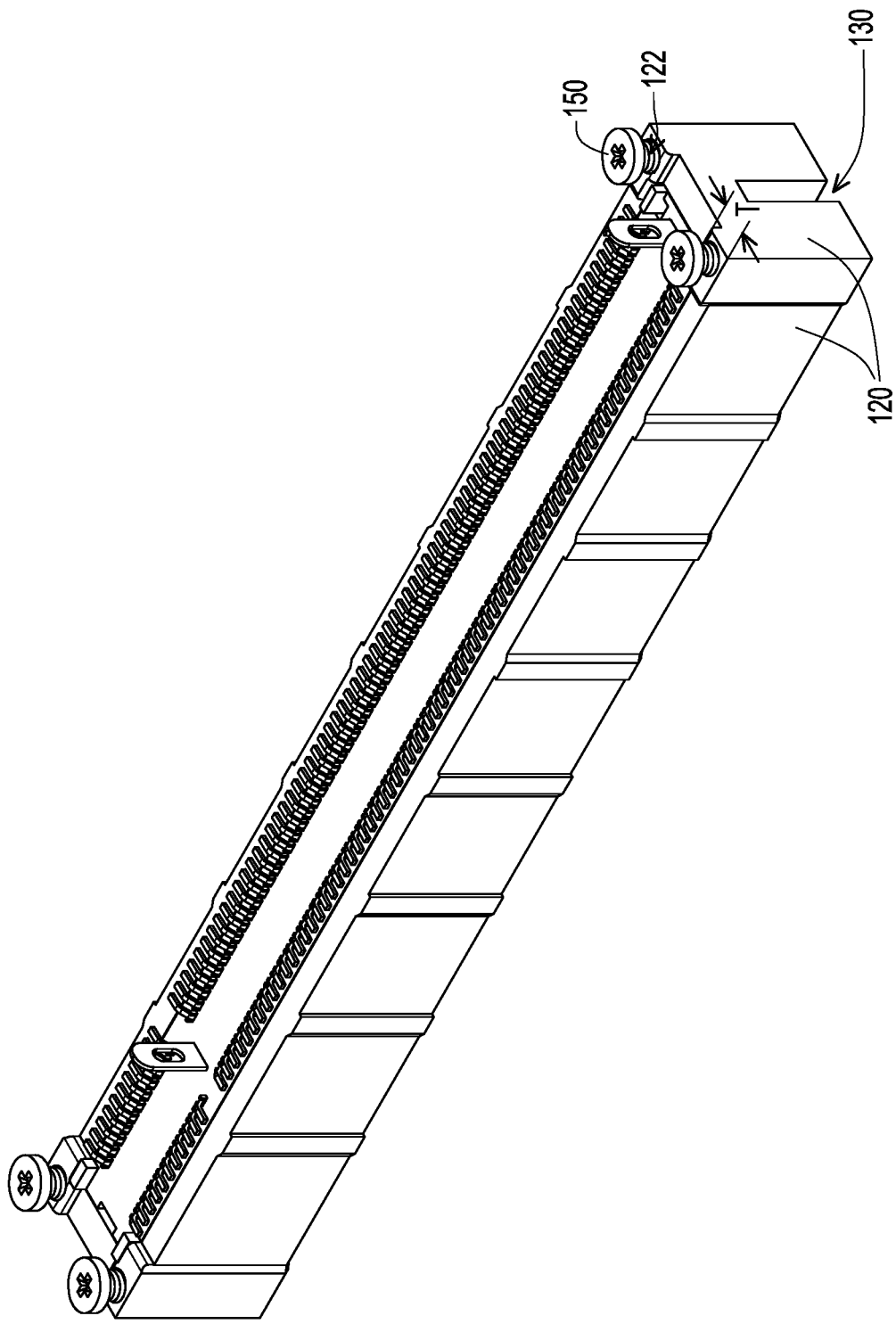
FIG. 4 is a schematic view of FIG. 2 in another viewing angle.
Figure 5:
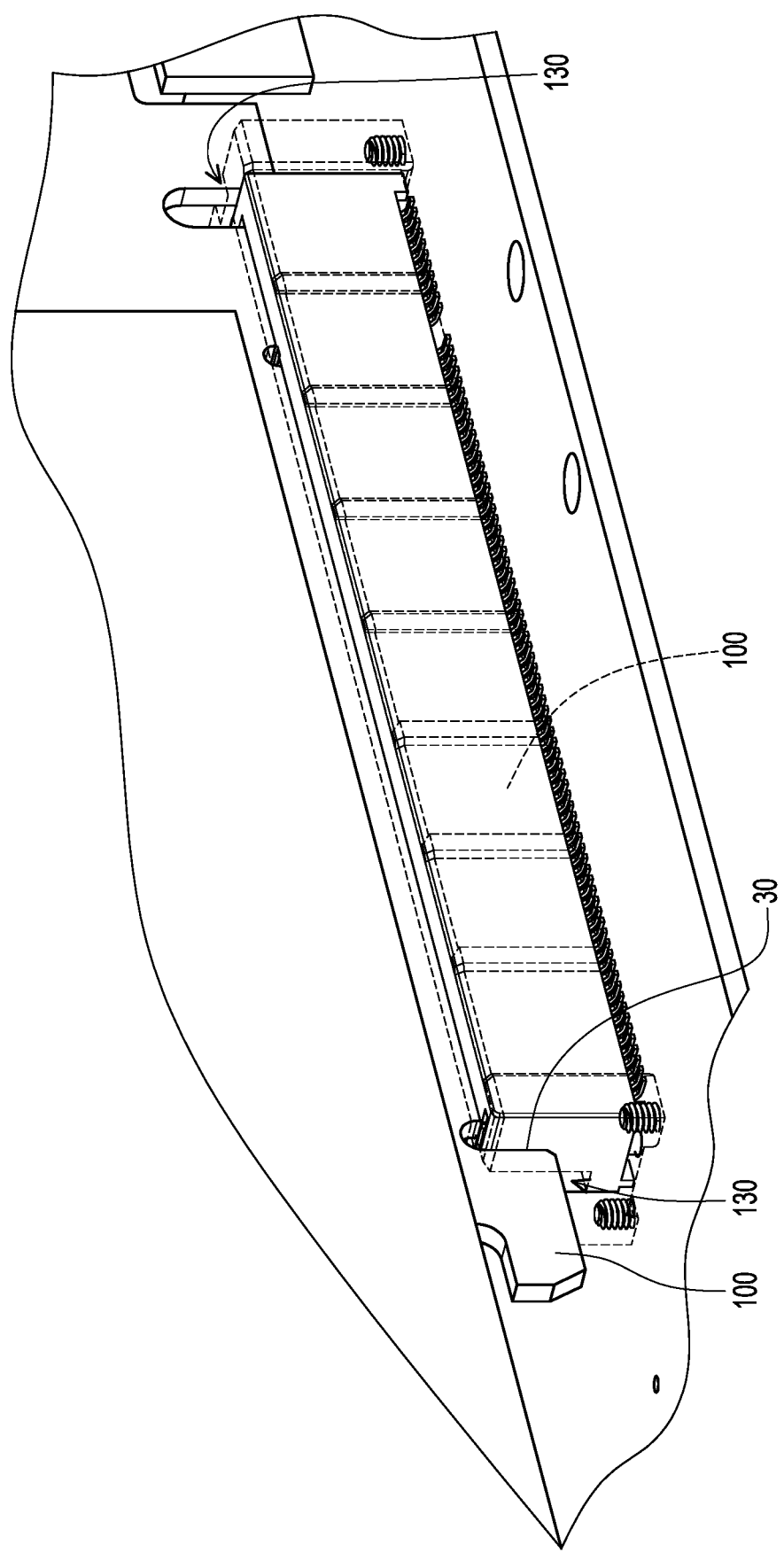
FIG. 5 is a partially enlarged view of FIG. 1.

FIG. 1 is a schematic view of a circuit board module according to an embodiment of the disclosure. FIG. 2 is a schematic view of the connector protection device of the circuit board module in FIG. 1. FIG. 3 is a schematic exploded view of FIG. 2. FIG. 4 is a schematic view of FIG. 2 in another viewing angle. FIG. 5 is a partially enlarged view of FIG. 1. It should be noted that in FIG. 5, in order to show a connector 30 covered by a connector protection device 100, the connector protection device 100 is particularly represented by a dotted line.

Referring to FIG. 1 to FIG. 5, a circuit board module 20 of this embodiment includes a circuit board 22, a connector 30 (FIG. 5), and a connector protection device 100. It may be seen from FIG. 1 and FIG. 5 that the connector 30 is disposed on the circuit board 22 (FIG. 1) for an expansion card 10 to be inserted. The connector protection device 100 is disposed on the connector 30 and fixed on the circuit board 22.

As shown in FIG. 3, the connector 30 includes a connector top surface 32, a connector slot 34 recessed in the connector top surface 32, and multiple connector side surfaces 36 connected to the connector top surface 32. In this embodiment, the connector 30 is, for example, a PCI-E connector, and the expansion card 10 (FIG. 1) is, for example, a display card, but the types of the connector 30 and the expansion card 10 are not limited thereto.

The connector protection device 100 includes a protective shell top wall 110, multiple protective shell side walls 120, and two position-limiting structures 130. The protective shell top wall 110 covers the connector top surface 32 and includes a slot 112 corresponding to the connector slot 34. Both the connector slot 34 and the slot 112 extend along a first direction D1 (FIG. 2). The protective shell side walls 120 are connected to each other and to the protective shell top wall 110. The protective shell side walls 120 cover the connector side surfaces 36.

As shown in FIG. 2, the two position-limiting structures 130 are located adjacent to opposite ends of the slot 112 in the first direction D1. Each of the position-limiting structures 130 is used to limit a relative position of the expansion card 10 and the connector slot 34 in a second direction D2. The second direction D2 is perpendicular to the first direction D1.

Specifically, in this embodiment, each of the position-limiting structures 130 includes a notch recessed in the protective shell top wall 110 and one of the protective shell side walls 120. In this embodiment, a depression depth DP of the notch in the first direction D1 is between 1.5 mm and 5 mm, thereby providing sufficient depth for the expansion card 10 to be inserted and ensuring that the expansion card 10 remains at a position in the second direction D2 when being inserted.

Figure 6:
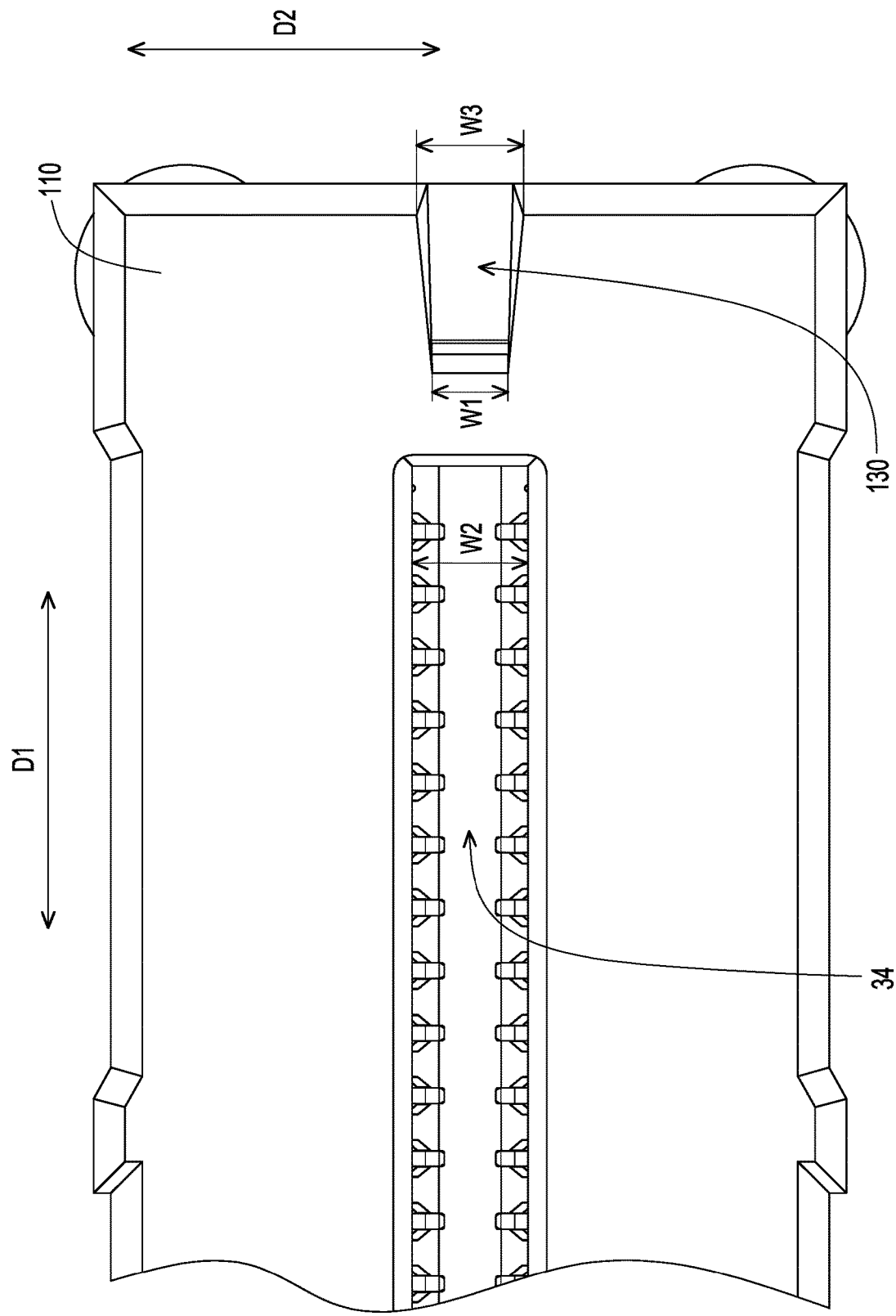
FIG. 6 is a partial top schematic view of FIG. 2.

FIG. 6 is a partial top schematic view of FIG. 2. Referring to FIG. 6, in this embodiment, a minimum width W1 of the position-limiting structures 130 (notch) in the second direction D2 is less than or equal to a width W2 of the connector slot 34, so that the position-limiting structures 130 (notch) may position the expansion card 10 more accurately in the second direction D2. Thus, referring to FIG. 5 again, in response to the expansion card 10 being inserted into the connector slot 34 (FIG. 3) through the slot 112, the expansion card 10 is inserted into the two position-limiting structures 130 and limited by the two position-limiting structures 130. More precisely, the expansion card 10 is limited by the two opposite walls adjacent to the position-limiting structures 130 (notch), so as to maintain the relative position with the connector slot 34 in the second direction D2 (FIG. 2).

In addition, as shown in FIG. 6, a position of the position-limiting structures 130 (notch) having a minimum width W1 in the second direction D2 is a position closest to the slot 112 (i.e., the leftmost portion of the notch in FIG. 6), and a position of the position-limiting structures 130 (notch) having the maximum width W2 in the second direction is a position farthest from the slot 112 (i.e., the rightmost portion of the notch in FIG. 6).

Such a design is due to the fact that the position-limiting structures 130 (notch) undergo a demolding stage during the manufacturing process, and due to process constraints, the limiting structure 130 (notch) slightly expands in the demolding direction. In this embodiment, the position-limiting structures 130 (notch) is intentionally designed to be demolded towards the right side of FIG. 6, rather than towards the direction of ejection from the paper surface of FIG. 6. Such a design reduces the extent of the position-limiting structures 130 (notch) appearing as wider at the top and narrower at the bottom in the direction of ejection from the paper surface of FIG. 6, allowing the position-limiting structures 130 (notch) to better limit the expansion card 10 in the second direction D2.

In addition, as shown in FIG. 4, the protective shell side walls 120 includes multiple locking holes 122. Multiple screwing members 122 pass through the circuit board 22

(FIG. 5) and are fixed in the locking holes 122, so that the connector protection device 100 is fixed on the circuit board 22. Thus, the connector protection device 100 of this embodiment may be firmly fixed on the circuit board 22.

A thickness T of the protective shell side walls 120 at the locking holes 122 is between 1.5 mm and 5 mm, so as to dispose the locking holes 122. In this embodiment, further, the thickness T of each of the protective shell side walls 120 is between 1.5 mm and 5 mm. Thus, in addition to providing sufficient thickness T for disposing of the locking holes 122, the protective shell side walls 120 have a relatively large thickness T and thus has better structural strength.

Referring to FIG. 2 again, in this embodiment, the connector protection device 100 further includes multiple reinforcement ribs 140, which are uniformly disposed on the protective shell side walls 120. The reinforcement ribs 140 extend along a third direction D3 (FIG. 2) on the protective shell side walls 120 and extend from the protective shell top wall 110 to the circuit board 22 (FIG. 1), so as to provide better structural strength to avoid being crushed by the expansion card 10 and the heat sink.

Below are other exemplary embodiments, and only the differences will be explained. Please refer to the previous embodiments for the rest.

Figure 7:
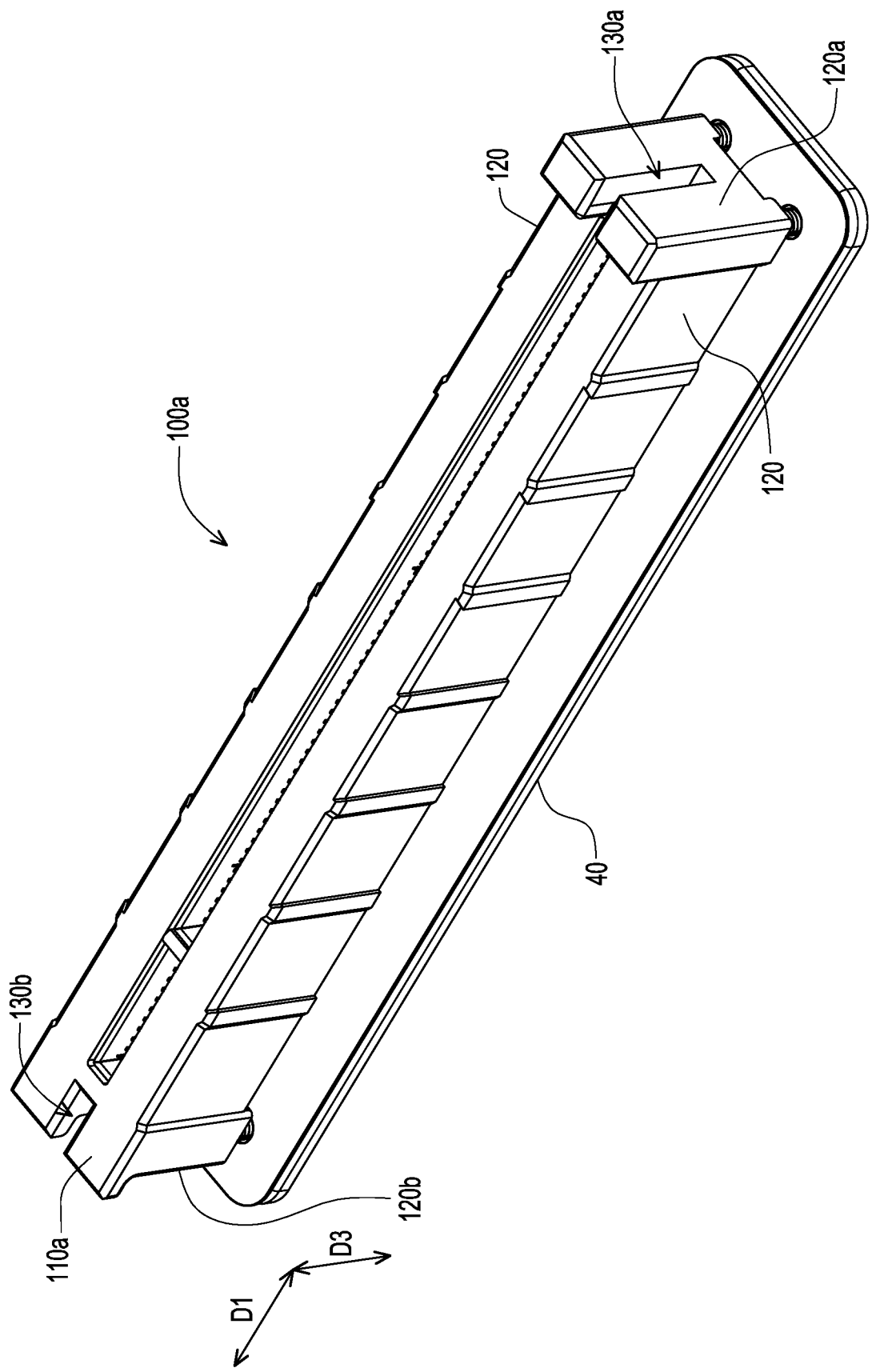
FIG. 7 is a schematic view of a connector protection device according to another embodiment of the disclosure.

FIG. 7 is a schematic view of a connector protection device according to another embodiment of the disclosure. Referring to FIG. 7, the main difference between the connector protection device 100a in this embodiment and the connector protection device 100 in FIG. 2 is that, in this embodiment, the protective shell side wall 120a protrudes from the protective shell top wall 110a in a third direction, and the position-limiting structure 130a includes a notch recessed in the protective shell side wall 120a.

In addition, the protective shell top wall 110a protrudes from one of the protective shell side walls 120b in the first direction D1, and the position-limiting structure 130b includes a portion recessed in the protective shell top wall 110a (especially a portion protruding from the corresponding protective shell side wall 120b) and a notch of the corresponding protective shell side wall 120b. In this embodiment, such a design may provide a deeper notch, so that the position of the expansion card 10 when being inserted may be maintained in the second direction D2.

In addition, it may be seen from FIG. 7 that a structural reinforcement member 40 may be disposed under the connector protection device 100a and the circuit board 22 (FIG. 1), and the screwing members 150 (FIG. 2) may sequentially pass through the structural reinforcement member 40 and the circuit board 22 (FIG. 1) and be fixed on the connector protection device 100a.

Figure 8:
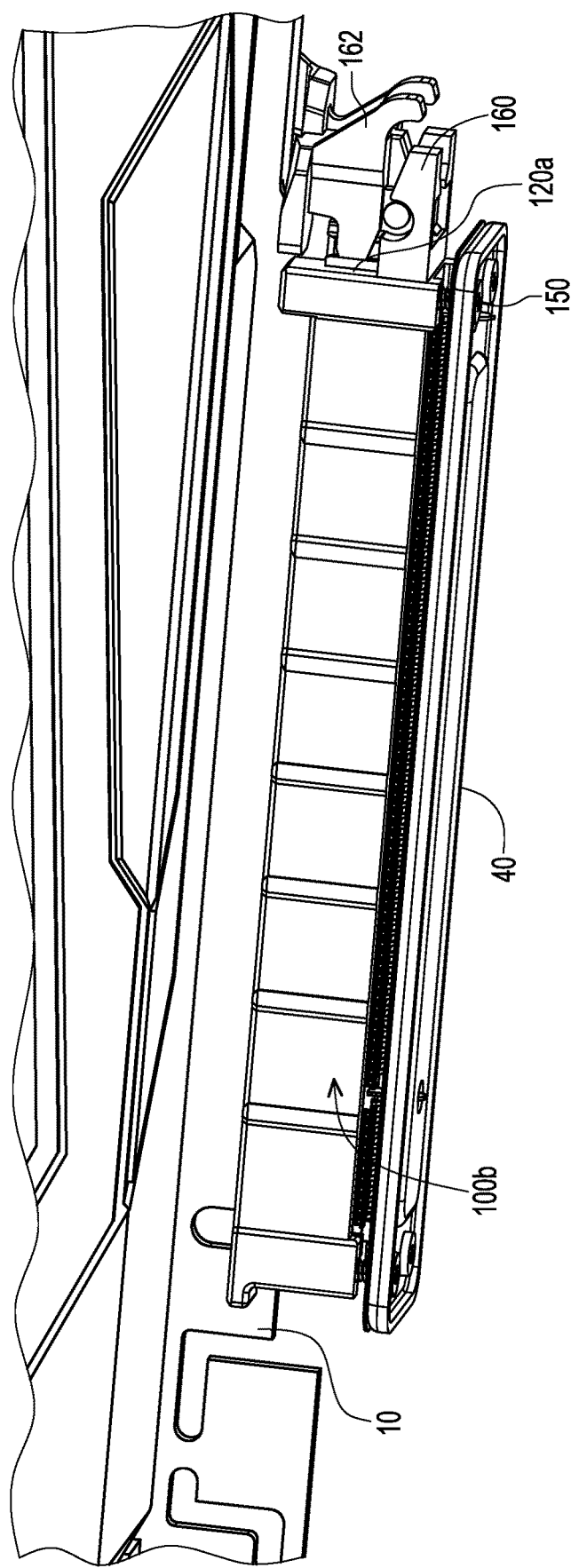
FIG. 8 is a schematic view of a connector protection device according to another embodiment of the disclosure.

FIG. 8 is a schematic view of a connector protection device according to another embodiment of the disclosure. Referring to FIG. 8, the main difference between the connector protection device 100b in this embodiment and the connector protection device 100a in FIG. 7 is that, the connector protection device 100b further includes a pivot stand 160 disposed on the protective shell side wall 120a for pivoting of an expansion card holder 162.

To sum up, the two position-limiting structures in the connector protection device of the disclosure are located adjacent to opposite ends of the slot in the first direction. In response to the expansion card being inserted into the connector slot through the slot, the expansion card is limited by the two position-limiting structures so as to maintain the relative position with the connector slot in the second direction. In this way, the connector protected by the connector protection device is not easily cracked due to the heavy pressure on one side of the inserted expansion card. In addition, the expansion card is limited by the two position-limiting structures in response to being inserted into the connector slot by a user. Thus, there is no need for additional assembly or locking processes, making it very convenient to use.

What is claimed is:

1. A connector protection device, adapted to be disposed on a connector, wherein the connector is adapted for an expansion card to be inserted, the connector comprises a connector top surface, a connector slot recessed in the connector top surface, and a plurality of connector side surfaces connected to the connector top surface, and the connector protection device comprises:
    a protective shell top wall, adapted to cover the connector top surface and comprising a slot corresponding to the connector slot, wherein the slot extends along a first direction;
    a plurality of protective shell side walls, connected to each other and to the protective shell top wall, wherein the protective shell side walls are adapted to cover the connector side surfaces; and
    two position-limiting structures, located adjacent to opposite ends of the slot in the first direction, wherein each of the position-limiting structures is used to limit a relative position of the expansion card and the connector slot in a second direction, the second direction is perpendicular to the first direction, wherein
    in response to the expansion card being inserted into the connector slot through the slot, the expansion card is limited by the two position-limiting structures so as to maintain the relative position with the connector slot in the second direction.

2. The connector protection device according to claim 1, wherein each of the position-limiting structures comprises a notch recessed in the protective shell top wall and one of the protective shell side walls.

3. The connector protection device according to claim 2, wherein a minimum width of the notch in the second direction is less than or equal to a width of the connector slot.

4. The connector protection device according to claim 2, wherein a depression depth of the notch in the first direction is between 1.5 mm and 5 mm.

5. The connector protection device according to claim 2, wherein the notch has a maximum width at a position farthest from the slot in the second direction and a minimum width at a position closest to the slot in the second direction.

6. The connector protection device according to claim 1, wherein the protective shell side walls comprise a plurality of locking holes, the connector is located on a circuit board, and a plurality of screwing members pass through the circuit board and are fixed in the locking holes, so that the connector protection device is fixed on the circuit board.

7. The connector protection device according to claim 6, wherein a thickness of the protective shell side walls at the locking holes is between 1.5 mm and 5 mm.

8. The connector protection device according to claim 1, wherein a thickness of each of the protective shell side walls is between 1.5 mm and 5 mm.

9. The connector protection device according to claim 6, further comprising a plurality of reinforcement ribs disposed on the protective shell side walls.

10. The connector protection device according to claim 9, wherein the reinforcement ribs extend along a third direction on the protective shell side walls and extend from the protective shell top wall to the circuit board.

11. The connector protection device according to claim 1, wherein the protective shell top wall protrudes from one of the protective shell side walls in the first direction, one of the position-limiting structures comprises a portion recessed in the protective shell top wall and protruding from a corresponding protective shell side wall and a notch of the corresponding protective shell side wall, another protective shell side wall protrudes from the protective shell top wall in a third direction, and another position-limiting structure comprises a notch recessed in the protective shell side wall.

12. The connector protection device according to claim 1, further comprising a pivot stand disposed on one of the protective shell side walls for pivoting of an expansion card holder.

13. A circuit board module, comprising:
a circuit board;
a connector, disposed on the circuit board for an expansion card to be inserted and comprising a connector top surface, a connector slot recessed in the connector top surface, and a plurality of connector side surfaces connected to the connector top surface; and
a connector protection device, disposed on the connector and fixed on the circuit board, comprising:
a protective shell top wall, covering the connector top surface and comprising a slot corresponding to the connector slot, wherein the slot extends along a first direction;
a plurality of protective shell side walls, connected to each other and to the protective shell top wall, wherein the protective shell side walls cover the connector side surfaces; and
two position-limiting structures, located adjacent to opposite ends of the slot in the first direction, wherein each of the position-limiting structures is used to limit a relative position of the expansion card and the connector slot in a second direction, the second direction is perpendicular to the first direction, wherein
in response to the expansion card being inserted into the connector slot through the slot, the expansion card is limited by the two position-limiting structures so as to maintain the relative position with the connector slot in the second direction.

14. The circuit board module according to claim 13, wherein each of the position-limiting structures comprises a notch recessed in the protective shell top wall and one of the protective shell side walls.

15. The circuit board module according to claim 14, wherein a minimum width of the notch in the second direction is less than or equal to a width of the connector slot.

16. The circuit board module according to claim 14, wherein a depression depth of the notch in the first direction is between 1.5 mm and 5 mm.

17. The circuit board module according to claim 14, wherein the notch has a maximum width at a position farthest from the slot in the second direction and a minimum width at a position closest to the slot in the second direction.

18. The circuit board module according to claim 13, wherein the protective shell side walls comprise a plurality of locking holes, a plurality of screwing members pass through the circuit board and are fixed in the locking holes, so that the connector protection device is fixed on the circuit board.

19. The circuit board module according to claim 18, wherein a thickness of the protective shell side walls at the locking holes is between 1.5 mm and 5 mm.

20. The circuit board module according to claim 18, further comprising: a structural reinforcement member, wherein the screwing members sequentially pass through the structural reinforcement member and the circuit board and are fixed in the locking holes.

21. The circuit board module according to claim 14, wherein a thickness of each of the protective shell side walls is between 1.5 mm and 5 mm.

22. The circuit board module according to claim 14, wherein the connector protection device further comprises: a plurality of reinforcement ribs disposed on the protective shell side walls.

23. The circuit board module according to claim 22, wherein the reinforcement ribs extend along a third direction on the protective shell side walls and extend from the protective shell top wall to the circuit board.

24. The circuit board module according to claim 13, wherein the protective shell top wall protrudes from one of the protective shell side walls in the first direction, one of the position-limiting structures comprises a portion recessed in the protective shell top wall and protruding from a corresponding protective shell side wall and a notch of the corresponding protective shell side wall, another protective shell side wall protrudes from the protective shell top wall in a third direction, and another position-limiting structure comprises a notch recessed in the protective shell side wall.

25. The circuit board module according to claim 13, wherein the connector protection device further comprises: a pivot stand disposed on one of the protective shell side walls for pivoting of an expansion card holder.

* * * * *